(12) United States Patent
Fondekar et al.

(10) Patent No.: US 9,740,768 B2
(45) Date of Patent: Aug. 22, 2017

(54) INTELLIGENT SYSTEM AND METHOD FOR PROCESSING DATA TO PROVIDE RECOGNITION AND EXTRACTION OF AN INFORMATIVE SEGMENT

(71) Applicant: Tata Consultancy Services Limited, Mumbai (IN)

(72) Inventors: Dipti Mohan Fondekar, Mumbai (IN); Mahesh Kshirsagar, Mumbai (IN)

(73) Assignee: Tata Consultancy Services Limited, Mumbai (IN)

( * ) Notice: Subject to any disclaimer, the term of this patent is extended or adjusted under 35 U.S.C. 154(b) by 494 days.

(21) Appl. No.: 14/155,066

(22) Filed: Jan. 14, 2014

(65) Prior Publication Data
US 2014/0201223 A1     Jul. 17, 2014

(30) Foreign Application Priority Data
Jan. 15, 2013  (IN) ............................ 131/MUM/2013

(51) Int. Cl.
*G07F 17/30*   (2006.01)
*G06F 17/30*   (2006.01)

(52) U.S. Cl.
CPC .............................. *G06F 17/30657* (2013.01)

(58) Field of Classification Search
CPC ....................... G06F 17/30722; G06F 21/6245
See application file for complete search history.

(56) References Cited

U.S. PATENT DOCUMENTS

| | | | |
|---|---|---|---|
| 7,251,625 B2 * | 7/2007 | Anglum ................. | G06Q 30/02 705/35 |
| 7,708,189 B1 * | 5/2010 | Cipriano .............. | G06Q 20/322 235/375 |
| 7,936,925 B2 * | 5/2011 | Martin .................. | G06F 17/243 382/175 |

(Continued)

OTHER PUBLICATIONS

Smeulders, AWM, "Content-based image retrieval at the end of the early years," IEEE Transactions on Pattern Analysis and Machine Intelligence, vol. 2 , No. 12, Dec. 2000, 32 pages.

(Continued)

*Primary Examiner* — Debbie Le
(74) *Attorney, Agent, or Firm* — Finnegan, Henderson, Farabow, Garrett & Dunner LLP

(57) ABSTRACT

The present disclosure in particular relates to data processing, and more particularly, to systems and methods for identifying and extracting an informative segment from data objects. In one embodiment, a system for facilitating identification of an informative segment from a data is provided. The system includes one or more processors; and a memory storing processor-executable instructions comprising instructions to generate a customized search query based on one or more input parameters, process the data to obtain a plurality of machine-readable data objects, obtain one or more approximate results corresponding to the informative segment based on the customize search query and the plurality of data objects, validate the one or more approximate results based on a comparison of the one or more approximate results and the data, and provide the validated one or more approximate result to identify the informative segment.

21 Claims, 2 Drawing Sheets

(56) References Cited

U.S. PATENT DOCUMENTS

| | | | |
|---|---|---|---|
| 8,301,893 B2* | 10/2012 | Brundage | G06T 1/0071 |
| | | | 713/176 |
| 2004/0070793 A1 | 4/2004 | Lech et al. | |
| 2006/0085477 A1* | 4/2006 | Phillips | G06F 17/30247 |
| 2006/0101327 A1* | 5/2006 | Mandelbaum | G06F 17/2211 |
| | | | 715/229 |
| 2006/0157559 A1* | 7/2006 | Levy | G06K 17/00 |
| | | | 235/380 |
| 2007/0003147 A1 | 1/2007 | Viola et al. | |
| 2007/0168382 A1* | 7/2007 | Tillberg | G06F 17/30253 |
| 2008/0005105 A1 | 1/2008 | Lawler et al. | |
| 2009/0077617 A1* | 3/2009 | Levow | H04L 12/585 |
| | | | 726/1 |
| 2009/0208144 A1* | 8/2009 | Lin | H04N 1/00236 |
| | | | 382/321 |
| 2013/0204754 A1* | 8/2013 | Brelig | G06Q 30/0201 |
| | | | 705/29 |

OTHER PUBLICATIONS

Andrei Popescu-Belis, Erik Boesrtjes, Jonathan Kilgour, Peter Poller, Sandro Castronovo, Theresa Wilson, Alejandro Jaimes, Jean Carletta, "The AMIDA Automatic Content Linking Device: Just-in-Time Document Retrieval in Meetings," 2008.

\* cited by examiner

INTELLIGENT SYSTEM AND METHOD FOR PROCESSING DATA TO PROVIDE RECOGNITION AND EXTRACTION OF AN INFORMATIVE SEGMENT

PRIORITY CLAIM

This U.S. patent application claims priority under 35 U.S.C. §119 to: India Application No. 131/MUM/2013, filed Jan. 15, 2013. The aforementioned application is incorporated herein by reference in its entirety.

TECHNICAL FIELD

The present disclosure in particular relates to data processing, and more particularly, to systems and methods for identifying and extracting an informative segment from data objects.

BACKGROUND

Technologies of searching an informative portion in a particular document are becoming more and more advanced. In day to day life, as storing data in electronic form becomes a common practice, related technology has are also developed to support data storage in almost every format. For example, nowadays, hand written documents, images, or receipt scan be easily scanned and stored. While the data storing technologies is rapidly developing, searching and retrieving required information from the stored documents is still challenging. There are constraints when one needs to reach a particular portion in the stored data. For example, the stored data may be in an image format that is not searchable.

Many service/product providing sectors, such as BPOs (business process outsourcing), call centers, and government offices (e.g., passport offices and license offices), generate and store hand written and scanned copies of documents (e.g., mortgage applications, insurance claims, and tax returns). For these sectors, such documents are an important part of daily operations. These documents may be obtained from different sources, such as customers, business partners, vendors, governments, and semi-government agencies. Often times, these documents are unstructured and their formats depend on the source from which the documents are obtained. Moreover, such type of data (e.g., the above described documents) may be stored in massive quantities. As a result, when there is a need to search certain information from the stored data, tone may be required to locate and extract the information manually because the data may include non-searchable images. Therefore, searching for information from a large amount of data can be time consuming and challenging. For example, one may be required to scroll down a page and manually locate the requested information to find or validate the information.

Optical character recognition or interactive voice response (OCR/IVR) techniques are commonly used techniques for converting the scanned images of handwritten, typed, or printed data to document having electronic or mechanical forms so that automated data entry or data review can be enabled with respect to the documents. Accuracy of documents generated by the OCR/IVR techniques, however, may be difficult to achieve because the underlying data for generating the documents may not be structured or because noise maybe introduced during the OCR/IVR conversion process.

SUMMARY

Before the present systems and methods, enablement are described, it is appreciated that this application is not limited to the particular systems, and methodologies described herein, as there can be multiple possible embodiments which are not expressly illustrated in the present disclosures. It is also appreciated that the terminology used in the description is for the purpose of describing the particular versions or embodiments only, and is not intended to limit the scope of the present application. This summary is provided to introduce aspects related to systems and methods for facilitating identification of an informative segment from a data and the aspects are further described below in the detailed description. This summary is not intended to identify essential features of the claimed subject matter nor is it intended for use in determining or limiting the scope of the claimed subject matter.

In one embodiment, a system for facilitating identification of an informative segment from a data is provided. The system includes one or more processors; and a memory storing processor-executable instructions comprising instructions to generate a customized search query based on one or more input parameters, process the data to obtain a plurality of data objects, obtain one or more approximate results corresponding to the informative segment based on the customize search query and the plurality of data objects, validate the one or more approximate results based on the data, and provide the validated one or more approximate result to identify the informative segment.

In one embodiment, a method for facilitating identification of an informative segment from a data is provided. The method is performed by a processor using programmed instructions stored in a memory. The method comprises: generating a customized search query based on one or more input parameters; processing the data to obtain a plurality of data objects; obtaining one or more approximate results corresponding to the informative segment based on the customize search query and the plurality of data objects; validating the one or more approximate results based on the data; and providing the validated one or more approximate result to identify the informative segment.

In one embodiment, a non-transitory computer program product having embodied thereon computer program instructions for facilitating identification of an informative segment from a data is provided. The computer program product stores instructions. The instructions comprise instructions for: generating a customized search query based on one or more input parameters; processing the data to obtain a plurality of data objects; obtaining one or more approximate results corresponding to the informative segment based on the customize search query and the plurality of data objects; validating the one or more approximate results based on the data; and providing the validated one or more approximate result to identify the informative segment.

BRIEF DESCRIPTION OF DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
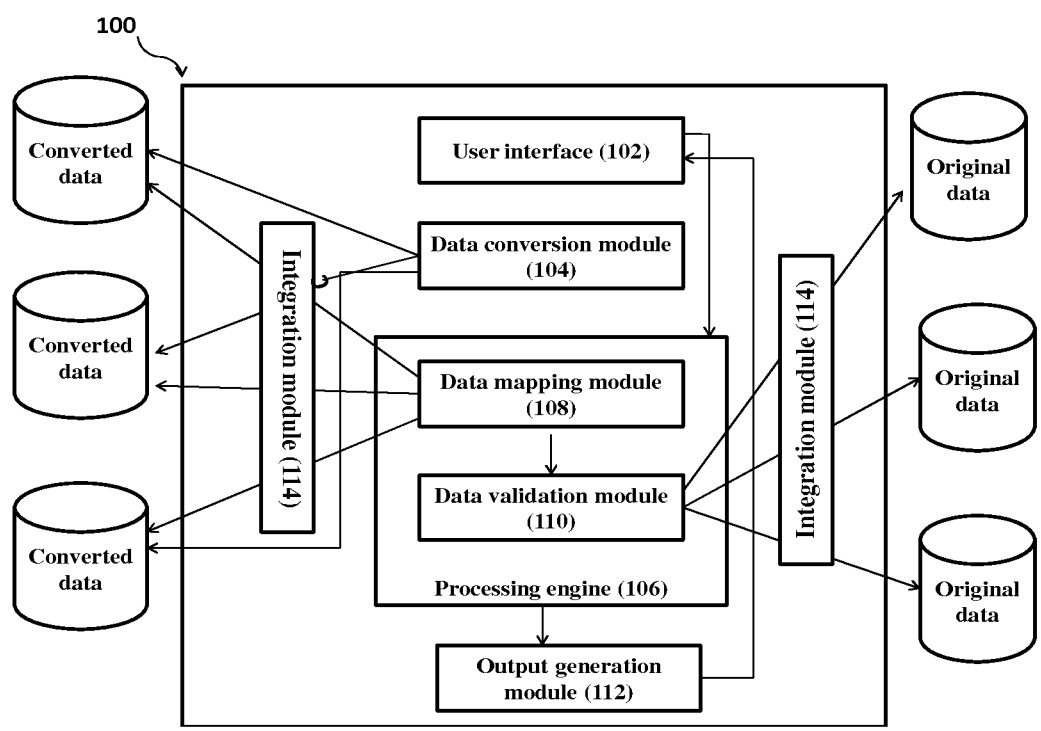
FIG. 1 illustrates an exemplary system architecture for data recognition and extraction in accordance with an embodiment of the present disclosure.

Exemplary embodiments are described with reference to the accompanying drawings. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. The words "comprising", "having", "containing", and "including", and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a", "an", and "the" include plural references unless the context clearly dictates otherwise. Although any systems, methods, apparatuses, and devices similar or equivalent to those described herein can be used in the practice or testing of embodiments of the present disclosure, exemplary systems and parts are now described. In the following description, for the purpose of explanation and understanding, reference has been made to embodiments for which the intent is not to limit the scope of the claimed subject matter.

One or more components of the claimed subject matter are described as module for the understanding of the specification. For example, a module may include self-contained component in a hardware circuit comprising of logical gate, semiconductor device, integrated circuits, or any other discrete or integrated components. A module may also be a part of any software programs executed by any hardware entities, such as one or more processors. The implementation of module as a software program may include a set of logical instructions to be executed by the one or more processors or by any other hardware entities. Further, a module may be incorporated with the set of instructions or a program by means of an interface.

The disclosed embodiments are merely exemplary of the claimed subject matter, which may be embodied in various forms.

The present disclosure relates to a system and method for facilitating recognition and extraction of an informative segment from a data. After the data in its original format (in mass) is stored in data storages, the same may be searched for extracting or pulling a piece of information from a particular data after changing the format of data into a searchable one. To make this process more efficient, the intelligent system and intelligent method facilitates in defining a customized search query by receiving one or more input parameters from a user in order to search and recognize an informative segment from the data object. The data object is converted into a machine readable format and stored in a data store. Further, the search query is processed to retrieve one or more close results by searching in one or more data stores. The results thus searched are also validated by referring to an original source of data (i.e., data in the original format).

In some embodiments, referring to FIG. 1, a system 100 (e.g., an intelligent system) may include a user interface 102. The user interface 102 may be configured to define the customized search query by receiving one or more input parameters from the user. The user interface 102 may include, for example, a keyboard, a touch pad, a mouse, a joystick, and/or any other desired hardware entity.

The system 100 may further comprise a data conversion module 104 configured to convert an original format of a data to a machine readable format. The system 100 may further comprise a processing engine 106 configured to obtain one or more approximate results with respect to a particular search query by searching one or more data storages. The processing engine 106 may further comprise a data mapping module 108 and a data validation module 110). The system 100 may also comprise an output generation module 112, which may be configured to retrieve one or more validated approximate segments of object results with respect to the user's customized search query.

In some embodiments, referring to FIG. 1, the data object in original format may be first stored in a particular data storage. For example, a soft copy of a user's identification (e.g., a driver license, a voter ID, etc.) may be scanned and stored in the data storage. The data object (e.g., a document) may later be searched to obtain an informative segment (e.g., a permanent account number of a user) from that data object.

In some embodiments, the system 100 may provide the user interface 102. User interface 102 may be configured to define the customized search query by receiving one or more input parameters from the user. These input parameters may be re-defined or customized according to the user's requirement or preferences (as shown in step 202 of FIG. 2). Based on the input parameters, the system 100 may execute the search query to obtain the informative segment from the data object stored in the data storage.

In some embodiments, after the search query is defined by providing one or more input parameters, the system 100 may process the query. As described above, often times, the format of data may be an obstacle for searching because, for example, the searching may not begin due to the unstructured data format. The system 100 may provide the data conversion module 104 configured to convert the original format of the data object into a machine readable format (as shown in step 204 of FIG. 2). The conversion of the data object from the original format into a machine readable format may be implemented by the (OCR) technique. The converted data object may be stored in a corresponding data storage for searching and recognizing the informative segment from the data object.

The data object may further comprise scanned images (e.g., images in a tiff or jpg format), which may include machine printed text and/or a combination of machine printed text and hand written data. The informative segment may comprise a text part of the data object. The original format of the data may further comprise a structured data, an unstructured data, a semi-structured data or a combination thereof.

In some embodiments, since data objects may be stored in a plurality of data storages, data objects with at least some similar keywords may be found in more than one data storage. The system 100 may thus search all data storages where there may be a possibility to obtain similar search results. Such search may improve accuracy in search results with respect to the particular search query. For the purpose of searching in more than one data storages with respect to one particular query, the system 100 may provide an integration module 114 (as shown in FIG. 1).

Still referring to FIG. 1, in some embodiments, the search query may be passed to one or more processing engines 106. The processing engine 106 may be configured to obtain one or more approximate results of informative segment (as shown in step 206 of FIG. 2) with respect to the customized search query by searching in one or more data storages. In some embodiments, the integration module 114) may assist in enabling the communication between the processing engine 106 and the one or more data storages.

In some embodiments, the one or more processor engines 106 may be implemented as one or more microprocessors, microcomputers, microcontrollers, digital signal processors, central processing units, state machines, logic circuitries, and/or any devices that manipulate signals based on operational instructions. Among other capabilities, the one or more processor engines 106 may be configured to fetch and execute computer-readable instructions stored in its memory.

In some embodiments, the integration module 114 may connect through various data storages and/or data repositories in order to obtain the results with respect to the desired informative segment. The processing engine 106 may implement programmed instructions to the approximate results. The programmed instructions may be a framework that includes the defining the metadata such as document classification information, document repository information, parsing catalog information, and process mapping information.

The document classification information may include required input image types, such as tiff, jpg, etc., and document characteristics, such as machine printed or handwritten.

The document repository information may include repository information, such as filenet, documentum, etc., with server details for connecting to the repository. Connection to the repository may be established using standard interfaces such as web services or repository specific API(s). After connection to the document repository in a non-interactive mode is established, one or more relevant data storages may be accessed and parsed non-interactively, based on the metadata defined and made available based on the context of the processing.

The parsing catalog information may include the required search criteria description with standard verbiages associated with each of the defined document and additional secondary verbiages that can be used. These verbiages may be keywords which can be parsed by the system 100 from the input data object for rendering the required snippet.

The process mapping information may include information regarding defining operations processes and/or sub-processes and mapping of the documents required with the search criteria's for the same.

The processing engine 106 may further comprise the data mapping module 108 configured to map the input parameters of the search query with the data stored in the corresponding database by using a text manipulation methodology (as shown in step 208 of FIG. 2) and further configured to parse through the data object to recognize the informative segment. This step of parsing may be performed by means of a parsing module (not shown) communicatively coupled with the processing engine 106. Within each of the data object, the data may be parsed by way of standard verbiages/secondary verbiages and rendering required snippets. For example, a particular business process may require that an application document including personal details, contact details, and employment details sections be viewed. In some embodiments, for each of the required section, the associated keyword/verbiages, such as "personal information," "current contacts," and "employment information," which are specific to the required contents in the input data object, may be included in the metadata definition.

In some embodiments, the text manipulation methodology may include parsing the input data object by locating the defined verbiages for every snippet. The readable data object that are created post OCR based on the structured or unstructured input data object may contain a variety of types of information, such as machine printed text, handwritten text, seals or stamps, signatures, logos, etc. Solution may have logic to identify the seal/logo or specific machine printed text. Based on the defined metadata, the verbiage associated with snippet may be located to determine its exact location. With this location information, the solution may refer back to the original image and render the required snippet information (informative segment).

In some embodiments, to retrieve one or more approximate results of the informative segments with respect to the customized search query, the process engine 106 may configure the classification information with respect to the data object. The processing engine 106 may configure the data object classification information with respect to the data type of the data object and/or data object contents. For example, the classification information for a document may include, but is not limited to, image types such as tiff or jpg. Moreover, the processing engine 106 may obtain the results by searching through structured, semi-structured, or unstructured data object.

After the customized search query is configured and processed, the processing engine 106 may obtain one or more approximate results of the informative segments with respect to the customized search query. The query may be searched in more than one data storages.

As shown in FIG. 1, the processing engine 106 may further comprise the validation module 110. Validation module 110 may confirm an accuracy of the recognized informative segment by referring to the data object in an original document stored in the original format in an original document database. For example, the informative segment recognized and extracted as the closest result may be compared with the data object in the original document to check the accuracy of the informative segment. This step may be completely automatic and connection to the original data storage (once the results are obtained) may be performed by the integration module 114. In some embodiments, the integration module 114 may also be capable of recognizing the data with its advanced configuration. For example, the integration module 114 may provide a connection only with the relevant data storages rather than connections to all the data storages presented. By way of a non-limiting example, while searching for a PAN number AXY2924, approximate results may include AXY2924 and AXY2429 where the user names are the same (e.g., Alok). The integration module may connect to the original document database where the original copies of the documents (e.g., document generated at the time of receiving and filling form of the user) are stored. The approximate results (e.g., PAN number AXY2924 and AXY2429 with the same user names) may be compared with the original document (e.g., the PAN card copy) in an original format and the correct approximate result (or result) based on comparison may be retrieved. Further, the results obtained from the comparison with the original document may be displayed to the user. While comparing with the original document, the original document may be converted to a machine readable format by using, for example, OCR. In some embodiments, the system, via the integration module 114, may check the accuracy of results where the original document in the original document database may be present and accessed by connecting to the original document database.

Figure 2:
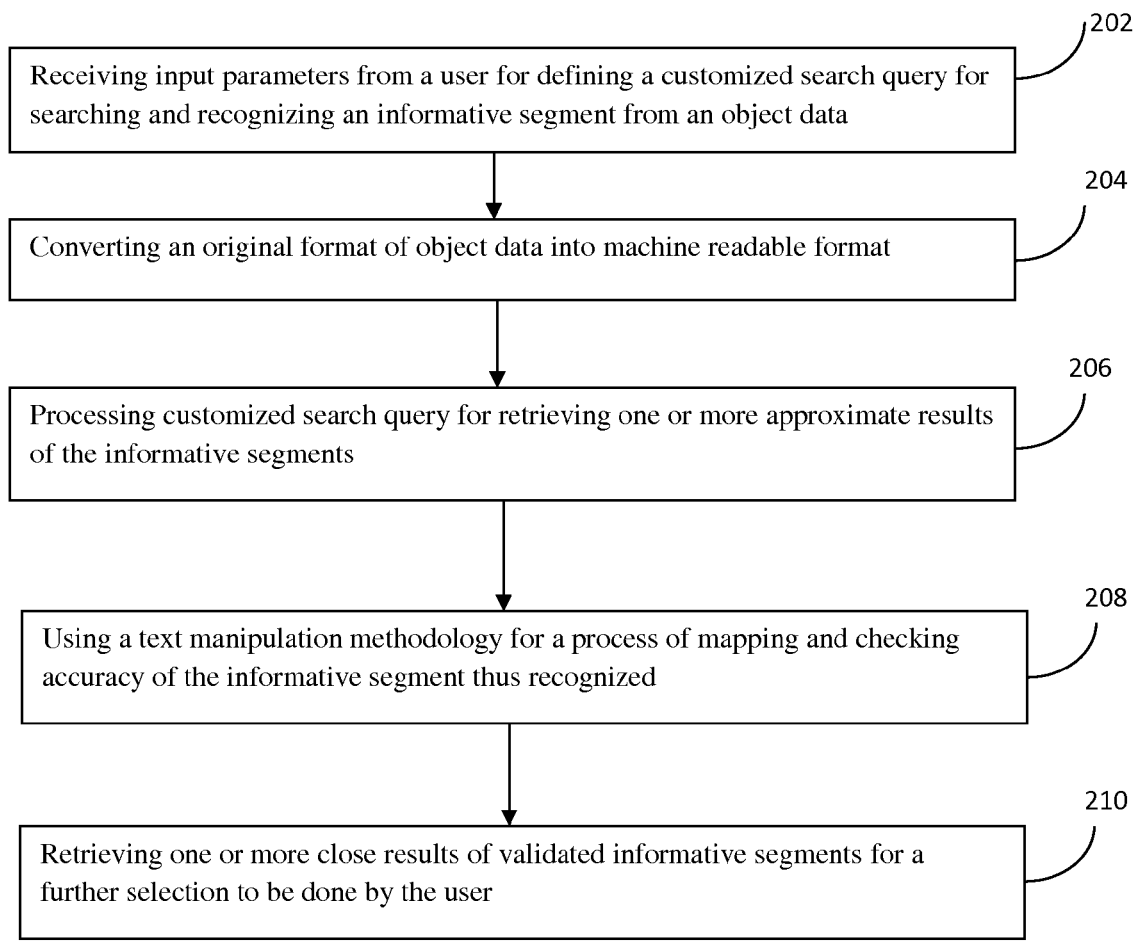
FIG. 2 is a flow chart illustrating an exemplary method for facilitating recognition and extraction of an informative segment from a data object in accordance with an embodiment of the present disclosure.

Still referring to FIG. 1, in some embodiments, the intelligent system 100 may further comprise the output generation module 112 to retrieve one or more validated approximate segments of object results with respect to the user's search query (as shown in step 210 of FIG. 2). This output generation module 112 may further include a display device or some similar hardware entity.

In some embodiments, the list of approximate results of validated informative segment may include one or more results from which the user can select the most correct or accurate result. The system 100 may also provide the user an access to view the mapping/validation of all the approximate results with those of the data object in the original document in original format so that it enables the user to efficiently select the correct result with correct informative segment from the list of approximate results.

In some embodiments, if the results obtained are not relevant, the user may also customize the search query, which may be re-processed, by changing the input parameters. The system 100 may check the accuracy/relevance of the list of the new/updated input parameters created by user and may accept the suggestive measures provided by the user.

In some embodiments, the intelligent system (e.g., the system 100) and intelligent method for recognizing and extracting an informative segment from an object data may be illustrated by example in the following paragraph. It is appreciated that the methods are not restricted to the examples.

As an example, in a government agency (e.g., an LIC office, a passport office, etc.), a user A's identity proof number in a document containing his sign (manual) may be stored in a system/data storage of some branch at some other location. One of the office assistants, before issuing an approval letter, may want to crosscheck the details from the documents with those written in the form.

The intelligent system and intelligent method of the present disclosure may provide the user a way to define his search query to search for the information from a machine converted format of the related document. The assistant may then prepare a search query by entering certain inputs parameters (e.g., a form number, an issued number, a passport number, etc.) and may enter his/her search via a user interface. As an example, the prepared query may include a name "Ashok" and a passport number 0056.

The processing engine of the system may then map the search query (e.g., the name and the passport number) with a plurality of data objects thus stored in some or all of the integrated data storages with respect to some or all of the branches. Certain results may be obtained. For example, two documents may be obtained with names of "Ashok" and "Ashoka" and with passport numbers of 0056 and 005 respectively, and PAN numbers that are supplied by the user as his or her identity proof documents may also be mapped.

In addition to sorting these results and selecting the accurate one, the validation module (e.g., the data validation module 110) of the processing engine (e.g., processing engine 106) may check the accuracy of all the results by referring to data in original document (e.g., PAN card for PAN number and voter ID card for name) in its original format (e.g., an image format) stored in the original document database and may reject those that are not correct. In the above example, the processing engine may consider both results as the approximate results of validated informative segments.

In some embodiments, both these validated results may be displayed to the assistant along with the informative segment that is mapped with that of the original document. As a result, the assistant may readily ensure the accuracy of the document if there are one or more results. The assistant, by referring to mapped keywords, may clearly identify the correct result and thus may select the result which includes the name "Ashok" and the passport number of 0056.

We claim:

1. A system for facilitating identification of an informative segment from a data, the system comprising:
   one or more processors;
   and a memory storing processor-executable instructions comprising instructions to:
   generate a customized search query based on one or more input parameters;
   process the data to obtain a plurality of machine-readable data objects by converting the data that has an original format to the plurality of machine-readable data objects, wherein the data in original format comprises a structured data, an unstructured data, and a semi-structured data: obtain one or more approximate results corresponding to the informative segment by searching the data based on the customized search query and the plurality of data objects;
   validate the one or more approximate results based on a comparison of the one or more approximate results and the data; and
   provide the validated one or more approximate result to identify the informative segment, wherein the result further comprises information regarding mapping and validation of the result with that of the original document in original format.

2. The system of claim 1, wherein the data comprises at least one of one or more scanned images and a machine printed text.

3. The system of claim 1, wherein the instructions to process the data further comprise instructions to:
   store the plurality of data objects in one or more data storages.

4. The system of claim 1, wherein the instructions to obtain one or more approximate results corresponding to the informative segment further comprise instructions to:
   map the one or more input parameters with the plurality of data objects stored in one or more data storages;
   parse the plurality of data objects based on a plurality of standard keywords;
   associate the plurality of standard keyword with a corresponding metadata; and
   recognize the informative segment in the data based on location information obtained using the metadata.

5. The system of claim 4, wherein the instructions to validate the one or more approximate results further comprise instructions to:
   generate a machine-readable data corresponding to the data stored in the original format; and
   determine an accuracy of the recognized informative segment based on a comparison of the one or more approximate results with the machine readable data.

6. The system of claim 1, wherein the instructions to process the data to obtain a plurality of data objects comprises instructions to process the data using an OCR (Optical Character Recognition) technique.

7. The system of claim 1, wherein the informative segment comprises a text part of the data.

8. A method for facilitating identification of an informative segment from a data, the method being performed by a processor using programmed instructions stored in a memory, the method comprising:

generating a customized search query based on one or more input parameters;

processing the data to obtain a plurality of machine-readable data objects by converting the data that has an original format to the plurality of machine-readable data objects, wherein the data in original format comprises a structured data, an unstructured data, and a semi-structured data;

obtaining one or more approximate results corresponding to the informative segment by searching the data based on the customized search query and the plurality of data objects;

validating the one or more approximate results based on a comparison of the one or more approximate results and the data; and providing the validated one or more approximate result to identify the informative segment, wherein the result further comprises information regarding mapping and validation of the result with that of the original document in original format.

9. The method of claim 8, wherein the data comprises at least one of one or more scanned images and a machine printed text.

10. The method of claim 8, wherein the processing of the data comprises:

storing the plurality of data objects in one or more data storages.

11. The method of claim 8, wherein the obtaining one or more approximate results corresponding to the informative segment comprises:

mapping the one or more input parameters with the plurality of data objects stored in one or more data storages;

parsing the plurality of data objects based on a plurality of standard keywords;

associating the plurality of standard keyword with a corresponding metadata; and recognizing the informative segment in the data based on location information obtained using the metadata.

12. The method of claim 11, wherein the validating of the one or more approximate results comprises:

generating a machine-readable data corresponding to the data stored in the original format; and determining an accuracy of the recognized informative segment based a comparison of the one or more approximate results with the machine readable data.

13. The method of claim 8, wherein the processing the data comprises processing the data using an OCR (Optical Character Recognition) technique.

14. The method of claim 8, wherein the informative segment comprises a text part of the data.

15. A non-transitory computer program product having embodied thereon a computer program instructions for facilitating identification of an informative segment from a data, the computer program product storing instructions, the instructions comprising instructions for:

generating a customized search query based on one or more input parameters;

processing the data to obtain a plurality of machine-readable data objects by converting the data that has an original format to the plurality of machine-readable data objects, wherein the data in original format comprises a structured data, an unstructured data, and a semi-structured data;

obtaining one or more approximate results corresponding to the informative segment by searching the data based on the customized search query and the plurality of data objects;

validating the one or more approximate results based on a comparison of the one or more approximate results and the data; and providing the validated one or more approximate result to identify the informative segment, wherein the result further comprises information regarding mapping and validation of the result with that of the original document in original format.

16. The computer program product of claim 15, wherein the data comprises at least one of one or more scanned images and a machine printed text.

17. The computer program product of claim 15, wherein the processing of the data comprises:

storing the plurality of data objects in one or more data storages.

18. The computer program product of claim 15, wherein the obtaining one or more approximate results corresponding to the informative segment comprises:

mapping the one or more input parameters with the plurality of data objects stored in one or more data storages;

parsing the plurality of data objects based on a plurality of standard keywords;

associating the plurality of standard keyword with a corresponding metadata; and recognizing the informative segment in the data based on location information obtained using the metadata.

19. The computer program product of claim 18, wherein the validating of the one or more approximate results comprises:

generating a machine-readable data corresponding to the data stored in the original format; and determining an accuracy of the recognized informative segment based on a comparison of the one or more approximate results with the machine readable data.

20. The computer program product of claim 15, wherein the processing the data comprises processing the data using an OCR (Optical Character Recognition) technique.

21. The computer program product of claim 15, wherein the informative segment comprises a text part of the data.

* * * * *